US012061170B2

(12) United States Patent
Xie et al.

(10) Patent No.: US 12,061,170 B2
(45) Date of Patent: Aug. 13, 2024

(54) TUNNEL DEFECT DETECTION AND MANAGEMENT SYSTEM BASED ON VIBRATION SIGNAL OF MOVING TRAIN

(71) Applicant: TONGJI UNIVERSITY, Shanghai (CN)

(72) Inventors: Xiongyao Xie, Shanghai (CN); Yonglai Zhang, Shanghai (CN); Hongqiao Li, Shanghai (CN); Biao Zhou, Shanghai (CN)

(73) Assignee: TONGJI UNIVERSITY (CN)

( * ) Notice: Subject to any disclaimer, the term of this patent is extended or adjusted under 35 U.S.C. 154(b) by 630 days.

(21) Appl. No.: 17/418,371

(22) PCT Filed: Dec. 25, 2020

(86) PCT No.: PCT/CN2020/139283
§ 371 (c)(1),
(2) Date: Jun. 25, 2021

(87) PCT Pub. No.: WO2021/143484
PCT Pub. Date: Jul. 22, 2021

(65) Prior Publication Data
US 2022/0120714 A1  Apr. 21, 2022

(30) Foreign Application Priority Data

Jan. 17, 2020  (CN) .......................... 202010051082.8

(51) Int. Cl.
G01N 29/04 (2006.01)
B61L 25/02 (2006.01)
(Continued)

(52) U.S. Cl.
CPC .......... *G01N 29/043* (2013.01); *B61L 25/021* (2013.01); *B61L 25/025* (2013.01);
(Continued)

(58) Field of Classification Search
None
See application file for complete search history.

(56) References Cited

U.S. PATENT DOCUMENTS

2016/0202214 A1* 7/2016 Komiya ............. G01N 29/4436
73/598
2019/0319835 A1* 10/2019 Mansfield ............... H04L 43/16

FOREIGN PATENT DOCUMENTS

CN  103077609 A  5/2013
CN  104246467 A  12/2014
(Continued)

OTHER PUBLICATIONS

International Search Report in PCT/CN2020/139283 dated Mar. 24, 2021.

*Primary Examiner* — Roy Y Yi
(74) *Attorney, Agent, or Firm* — Dilworth IP, LLC

(57) ABSTRACT

A tunnel defect detection and management system based on a vibration signal of a moving train. This system identifies the defects in a subway tunnel structure and soil behind a wall through the acquisition, transmission and analysis of an on-board acceleration signal. A signal acquisition sensor is mounted on the moving train. A signal acquisition module and a signal transmission system are mounted in the train to preprocess and compress the signal. A data processing and analysis server performs data analysis to quickly identify the defects of the tunnel and the auxiliary structure thereof, and determine a defect location and type. A tunnel management platform releases real-time detection information and health status of the tunnel, alarms for the defects, and releases the defect data to relevant personnel to take measures.

19 Claims, 2 Drawing Sheets

(51) Int. Cl.
*E21F 17/00* (2006.01)
*G01N 29/44* (2006.01)
*G06N 3/02* (2006.01)
*H04Q 9/00* (2006.01)

(52) U.S. Cl.
CPC ......... *E21F 17/00* (2013.01); *G01N 29/4472* (2013.01); *G01N 29/4481* (2013.01); *G06N 3/02* (2013.01); *H04Q 9/00* (2013.01); *G01N 2291/2636* (2013.01); *H04Q 2209/40* (2013.01)

(56) References Cited

FOREIGN PATENT DOCUMENTS

| | | | | |
|---|---|---|---|---|
| CN | 104634870 | A | 5/2015 | |
| CN | 104807607 | A | 7/2015 | |
| CN | 106802181 | A | 6/2017 | |
| CN | 110414073 | A | 11/2019 | |
| CN | 111257415 | A | 6/2020 | |
| JP | 2017040605 | A | 2/2017 | |
| WO | WO-2013124681 | A2 * | 8/2013 | ............. B61L 23/04 |
| WO | 2017102990 | A1 | 6/2017 | |

\* cited by examiner

TUNNEL DEFECT DETECTION AND MANAGEMENT SYSTEM BASED ON VIBRATION SIGNAL OF MOVING TRAIN

CROSS REFERENCE TO RELATED APPLICATION

This patent application claims the priority of Chinese Patent Application No. 202010051082.8, filed with China National Intellectual Property Administration (CNIPA) on Jan. 17, 2020 and entitled "TUNNEL DEFECT DETECTION AND MANAGEMENT SYSTEM BASED ON VIBRATION SIGNAL OF MOVING TRAIN", which is incorporated herein by reference in its entirety.

TECHNICAL FIELD

The present disclosure belongs to the field of civil engineering and computer technology, and relates to a shield tunnel defect detection method, in particular to a tunnel defect detection and management method based on a vibration signal of a moving train.

BACKGROUND ART

With the rapid development of the city and the construction of a large number of tunnels, the subway has become the main lifeline of urban traffic. Meanwhile, tunnel security has also become an increasingly important issue. At present, the tunnel defect detection mainly relies on deformation and vibration monitoring. Due to the cost factor, usually only fixed sensors are deployed in sensitive areas for monitoring, and the other areas can only rely on on-site inspection or machine vision recognition by maintenance personnel after the train is out of service. Besides, except for the apparent defect, the defect inside the tunnel lining or behind the wall cannot be detected efficiently. In addition, limited by the sensor technology, the health monitoring of the tunnel structure usually focuses on a specific point rather than the entire system. As a result, it is hard to carry out full-coverage monitoring of the tunnel area in the subway network, and it is impossible to detect the defect of the tunnel structure in time to avoid unnecessary operation accidents. Therefore, the study of an efficient and low-cost defect identification method for a shield tunnel structure has important academic significance and engineering application value.

SUMMARY

In order to overcome the shortcomings of the existing shield tunnel defect detection, an objective of the present disclosure is to provide a tunnel defect detection method. The present disclosure is low-cost and efficient, and greatly promotes the safe operation of the shield tunnel.

The present disclosure is achieved by the following technical solutions:

The present disclosure provides a tunnel defect detection and management system based on a vibration signal of a moving train. A design principle of the system is as follows: sensors are used to acquire a vibration signal of a train in service, and a wireless transmission module transmits the data to a server through a network; the data is analyzed and processed to identify a tunnel defect and determine an approximate location of the defect; then the defect data is released on a management cloud platform to provide a reference for real-time understanding of the health status of the tunnel. The present disclosure greatly improves the tunnel detection efficiency and reduces the detection cost and operational risk.

The shield tunnel defect detection and management system includes four subsystems, namely a signal acquisition system, a signal transmission system, a data processing system and a tunnel health management platform.

When the subway train in service runs in the shield tunnel, the signal acquisition system forms a coupled vibration system with a tunnel structure and a stratum, and uses sensors mounted on the train to acquire a vibration signal transmitted to the train. The sensors include a plurality of acceleration sensors, speed sensors and positioning sensors; the acceleration sensors and the speed sensors are mounted on an axle, a bogie and in a carriage, and are fixed by a magnetic base and a strapping; the positioning sensors are mounted in the carriage, and are fixed by a magnetic support. The sensors are wireless sensors with a sampling frequency of 2 kHz; the sensors send the data to an acquisition module in the carriage in real time after the data is acquired. The sensor has a built-in rechargeable battery, which can be recycled and has sufficient power to support real-time monitoring for a long time. The sensor automatically sleeps to save power when the subway train is out of service at night.

The signal transmission system includes a data receiving module, a data processing module, a data wireless transmission module and a power supply module. The signal transmission system is packaged in a box and can be mounted under a seat in a carriage of the same train as the sensor to avoid affecting a passenger. The data receiving module receives the measurement data transmitted by the sensor in real time. The data processing module includes a microprocessor, a memory and an encoder; the data processing module caches certain data, preliminarily organizes and compresses the data, and re-encodes the data. The data transmission module uploads the encoded data to the server through a 5G network or the Internet for data processing and analysis. The power supply module includes a transformer, a power cord and a storage battery; the power supply module supplies power directly from the carriage, or supplies power by the storage battery if there is no available power source.

The data processing system includes a high-performance computing processor, an ultra-large-capacity memory, a network module, a power supply module and analysis software. The high-performance computing processor includes a plurality of central processing units (CPUs) and graphics processing units (GPUs), supporting parallel computing and rapid processing of a large amount of data. The ultra-large-capacity memory can stably store a large amount of measurement data for a long time. The network module provides a stable network speed and as much bandwidth as possible, and stably receives data transmitted through the Internet. The power supply module includes a power cord and a large-capacity storage battery to provide stable power, so as to avoid data loss caused by sudden power failure.

The analysis software analyzes by:
  decoding and decompressing acquired train vibration signal data by means of existing data processing software such as matrix laboratory (MATLAB) and statistical package for the social sciences (SPSS) to obtain original acceleration, speed and location data $X(t, a_x, a_y, a_z, v, s)$, where t represents a time, v represents a speed, s represents a location, $a_x$ represents an X-axis acceleration, $a_y$ represents a Y-axis acceleration, and $a_z$ represents a Z-axis acceleration;
  performing, through existing algorithms such as wavelet packet transform (WPT) and Hilbert-Huang transform (HHT), a series of preprocessing such as denoising and enhancing a signal-to-noise ratio (SNR) of the original data;

performing dimensionality reduction through an existing principal component analysis (PCA) algorithm to construct a feature vector F(t,α) as a sample set of machine learning (ML), where t represents a time and α represents a feature vector after dimensionality reduction;

introducing a cyclic neural network classifier and a decision tree classifier, training the cyclic neural network classifier through an initial sample such that the cyclic neural network classifier is able to determine a defect, and training the decision tree classifier such that the decision tree classifier is able to determine a defect location, a defect type and a defect magnitude; quickly determining, by the cyclic neural network classifier, whether there is a tunnel defect; if yes, initially determining, by the decision tree classifier, the location and type of the tunnel defect, and outputting the location and type of the tunnel defect to assess the health of the tunnel;

further optimizing, and supplementing newly acquired data to the sample set to continue to train the neural network and decision tree classifier, so as to continuously improve the accuracy of the classifier; and releasing an assessment result on the tunnel health management platform to provide a reference for relevant personnel to maintain the tunnel.

The tunnel health management platform releases information such as tunnel health status, tunnel defect location and tunnel defect assessment, and can be installed as a mobile application (APP) in a mobile phone of relevant personnel in a subway operation and maintenance company; the information is released to the relevant personnel in real time when there is a heavy tunnel defect.

The tunnel defect detection and management system measures the vibration of the train in service through the coupled system in real time, analyzes the signal, quickly assesses the health status of the tunnel, preliminarily determines the location of the tunnel defect, and releases the assessment result to the operation and maintenance personnel, such that the relevant personnel can perform in-depth inspections by more professional and accurate equipment. The present disclosure can greatly improve the tunnel maintenance efficiency and reduce the cost and risk.

According to the above technical solutions, the present disclosure has the following advantages:

1. The present disclosure proposes a tunnel defect identification method based on the on-board vibration acceleration signal of the moving train. The present disclosure can quickly identify the internal defect of the tunnel and its auxiliary structure, preliminarily determine the defect location, perform high-efficiency monitoring of the health of the subway tunnel, and provide the health status of the tunnel in time for timely maintenance, so as to avoid major accidents.

2. The present disclosure uses the train in service as the carrier, avoiding the need to set up a special inspection vehicle, and greatly simplifies the sensor layout, thereby greatly reducing the cost of monitoring and maintenance.

3. The present disclosure establishes an ML-based tunnel defect identification algorithm, which, during train operation, extracts the feature vector from the acquired sample data and continuously trains the cyclic neural network classifier to continuously improve the efficiency and accuracy of defect identification.

4. The present disclosure establishes a complete tunnel health monitoring and management platform to grasp the health status of the tunnel in real time and discover the tunnel defect in time, which provides a reference for safe operation and further maintenance of the tunnel, so as to ensure the safety of people's property.

Figure 1:
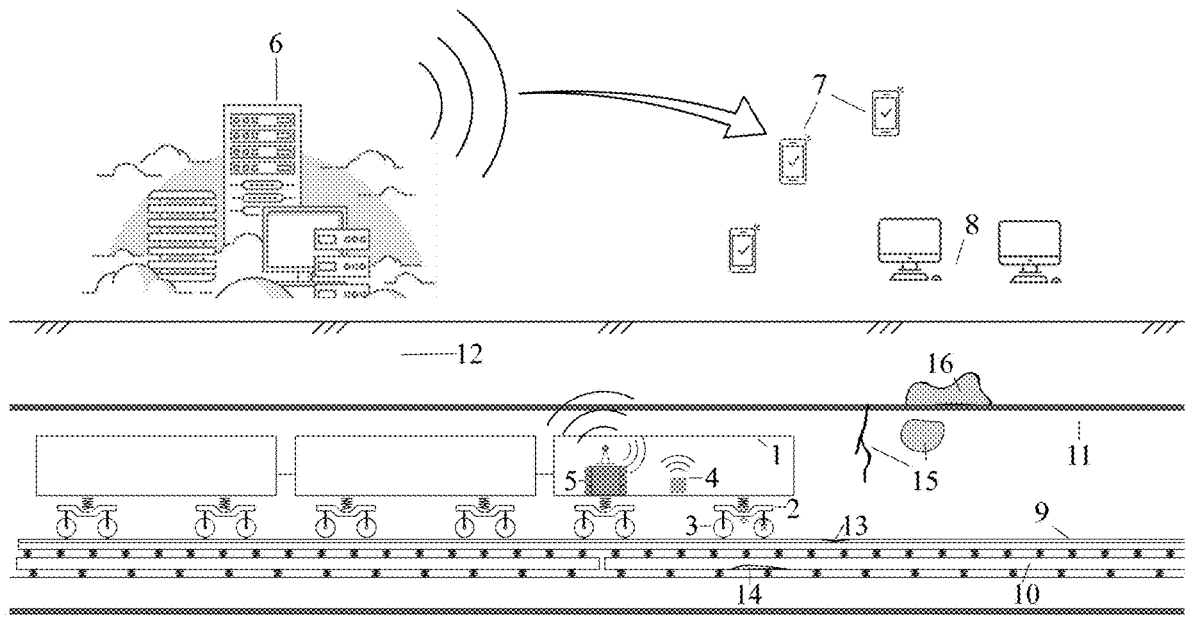
FIG. 1 is a structural diagram of a tunnel defect detection system based on a vibration signal of a moving train.

REFERENCE NUMERALS 1. train; 2. bogie; 3. wheelset; 4. sensor; 5. signal transmission system; 6. data processing system; 7. mobile terminal; 8. personal computer (PC) terminal; 9. track; 10. floating track slab; 11. tunnel; 12. soil; 13. track defect; 14. track slab defect; 15. tunnel defect; 16. soil discontinuity defect behind the segment.

DETAILED DESCRIPTION OF THE EMBODIMENTS

The present disclosure is further described below with reference to the embodiments and accompanying drawings.

Embodiment 1

Figure 2:
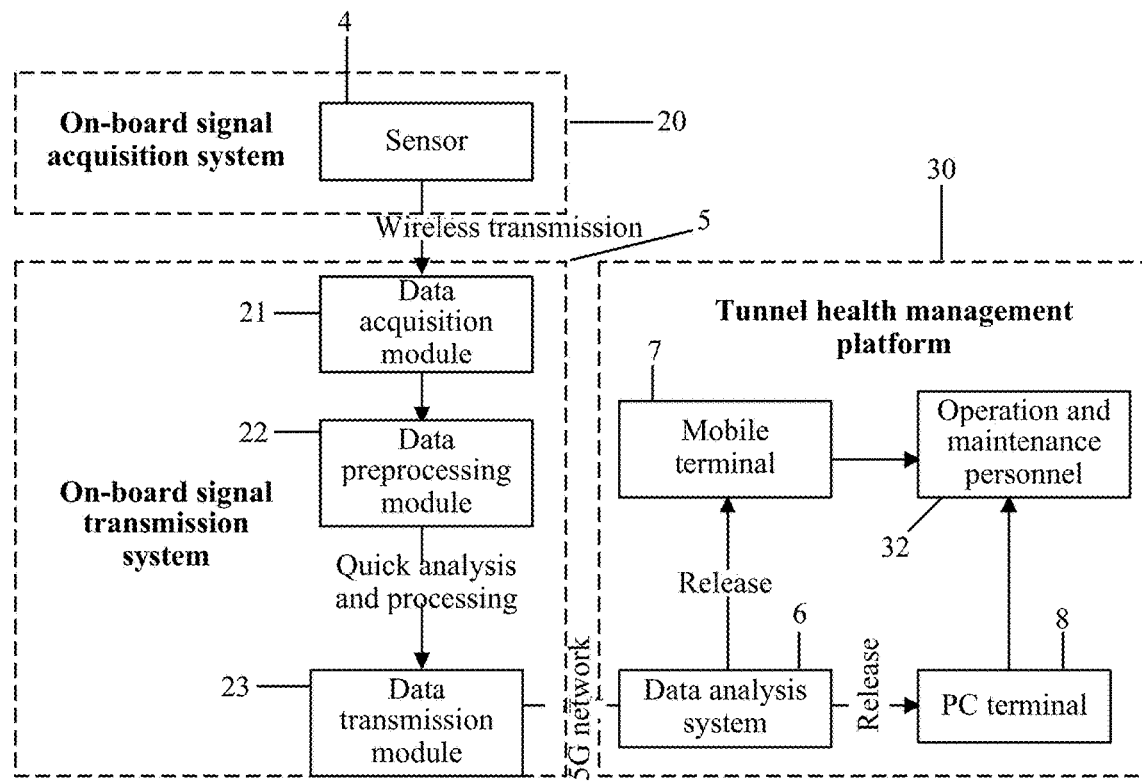
FIG. 2 is a schematic diagram of the tunnel defect detection system based on a vibration signal of a moving train.

As shown in FIG. 1, the present disclosure provides a tunnel defect detection and management method based on a vibration signal of a moving train. FIG. 2 shows a flowchart of the method. Sensors 4 are used to acquire vibration signals of a train 1 in service and a bogie 2 and a wheelset 3 thereof, and the train vibration data is wirelessly transmitted to an on-board signal transmission system 5 for preprocessing and compression. Then the data is transmitted to a cloud server through a 5G network. The data is analyzed and processed to identify defects of a tunnel 11 and an auxiliary structure thereof and determine an approximate location of the defect. Then the defect data is released on a management cloud platform to provide a reference for real-time understanding of the health status of the tunnel. The present disclosure greatly improves the tunnel detection efficiency and reduces the detection cost and operation risk.

As shown in FIGS. 1 and 2, the shield tunnel defect detection and management method uses four subsystems, namely a signal acquisition system 20, a signal transmission system 5, a data processing system 6 and a tunnel health management platform 30.

When the subway train 1 in service runs in the shield tunnel, the signal acquisition system 20 forms a coupled vibration system with a tunnel structure and a stratum, and uses sensors 4 mounted on the train 1 to acquire a vibration signal transmitted to the train 1. The sensor 4 include a plurality of acceleration sensors, speed sensors and positioning sensors; the acceleration sensors and the speed sensors are mounted on an axle of the wheelset 3, the bogie 2 and in a carriage, and are fixed by a magnetic base and a strapping; the positioning sensors are mounted in the carriage, and are fixed by a magnetic support. The sensors 4 are wireless sensors with a sampling frequency of 2 kHz. The sensor has a built-in rechargeable battery, which can be recycled and has sufficient power to support real-time monitoring for a long time. The sensor automatically sleeps to save power when the subway train 1 is out of service at night.

The sensors 4 send the data to an acquisition module 21 in the carriage in real time after the data is acquired. Then the acquisition module 21 transmits the data to the server for analysis. The signal transmission system 5 includes a data receiving module 21, a data processing module 22, a data wireless transmission module 23 and a power supply module. The signal transmission system 5 is packaged in a box and can be mounted under a seat in a carriage of the same train as the sensor 4 to avoid affecting a passenger. The data receiving module 21 receives the measurement data transmitted by the sensor 4 in real time. The data processing module 22 includes a microprocessor, a memory and an encoder. The data processing module 22 caches certain data, preliminarily organizes and compresses the data, and re-encodes the data. The data transmission module 22 uploads the encoded data to the server through a 5G network or the Internet for data processing and analysis. This part can be powered directly from the carriage, or by a storage battery if there is no available power source.

The data is transmitted through a network to the data processing system 6 for analysis. The data processing system 6 includes a high-performance computing processor, an ultra-large-capacity memory, a network module, a power supply module and analysis software. The network module provides a stable network speed and as much bandwidth as possible, and stably receives data transmitted through the Internet. Then a plurality of central processing units (CPUs) and graphics processing unit (GPUs) perform parallel computing and quickly process a large amount of data, analyze whether there are defects in the tunnel and its auxiliary structure or the soil, and assess the health of the subway tunnel. The defects include those occurring in a track 9, a floating track slab 10, the tunnel 11 and the soil 12. The main types of defects include but are not limited to track defect 13, track slab defect 14, track fasteners defect, steel spring defect, tunnel lining crack or concrete spalling, and soil discontinuity defect 16 behind lining wall. The analyzed data is stored in the ultra-large-capacity memory, which can be stored stably for a long time. The analysis result is released on the subway tunnel health management platform 30 to inform relevant personnel 32. Meanwhile, the processing system should have a stable power supply to avoid data loss caused by sudden power failure.

Figure 3:
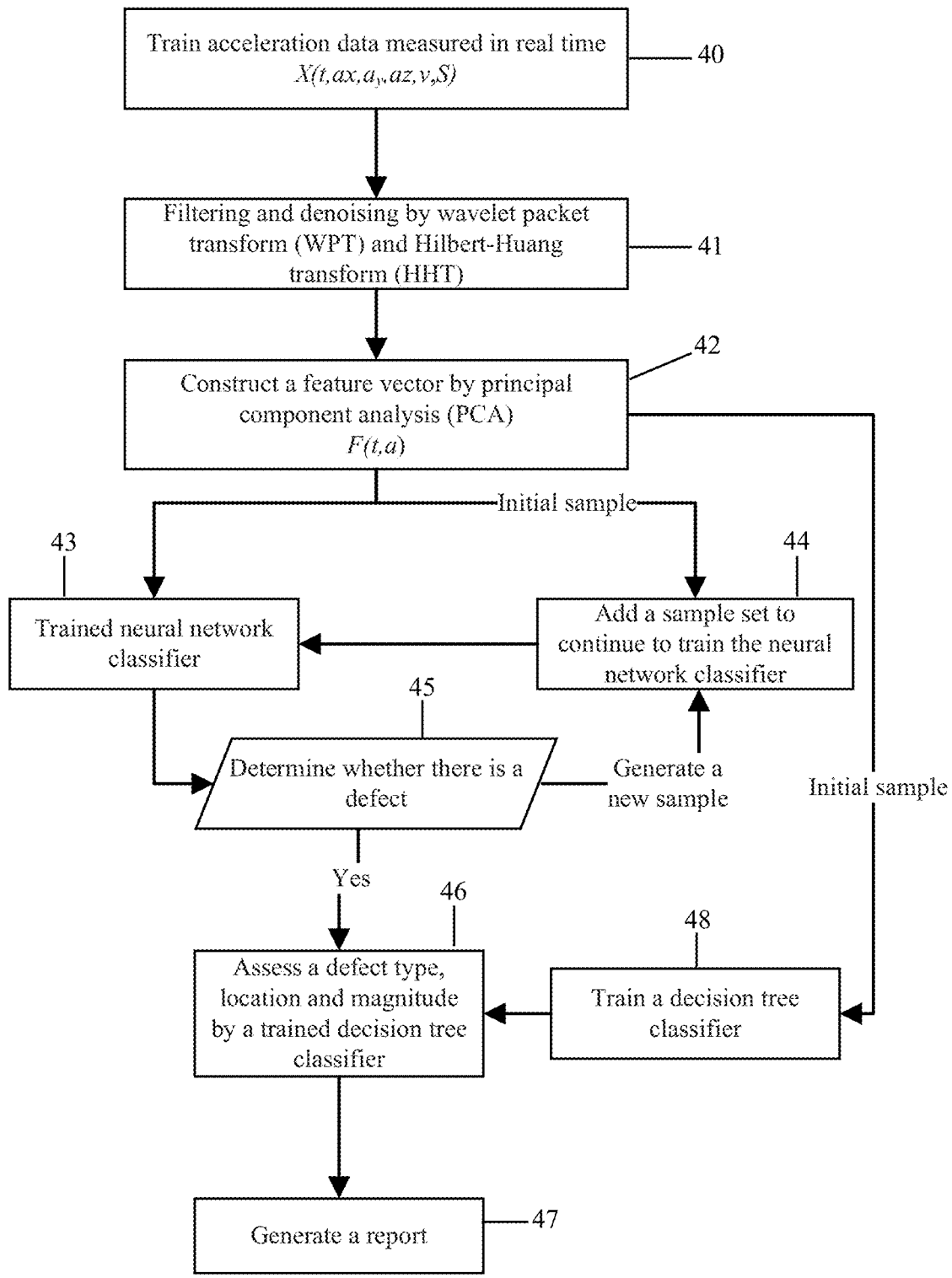
FIG. 3 shows a machine learning (ML)-based vibration data analysis algorithm.

As shown in FIG. 3, in the analysis process, existing professional data analysis software is used to decode and decompress the train vibration signal data, further denoise, enhance a signal-to-noise ratio (SNR), and then perform modal analysis and wavelet transform (steps 40, 41, 42). In addition, a machine learning (ML) method such as a convolutional neural network (CNN) is used to quickly identify the tunnel defect 15 (crack, concrete spalling), initially determine the location of the tunnel defect 15, and assess the health of the tunnel (steps 43, 44, 45, 46, 48). Finally, the assessment result is released on the tunnel health management platform 30 (step 47). Specifically, a cyclic neural network classifier and a decision tree classifier are introduced. The cyclic neural network classifier is trained through an initial sample (43,44) such that the cyclic neural network classifier is able to determine a defect (45), and the decision tree classifier is trained (48) such that the decision tree classifier is able to determine a defect location, a defect type and a defect magnitude (46). The cyclic neural network is used to quickly determine whether there is a tunnel defect (45). If yes, the decision tree classifier is used to initially determine the location and type of the tunnel defect (46) and output the location and type of the tunnel defect to assess the health of the tunnel (47). Further, a CNN classifier and a decision tree classifier are introduced. The CNN classifier is trained through an initial sample (43,44) such that the CNN classifier is able to determine a defect (45), and the decision tree classifier is trained such that the decision tree classifier is able to determine a defect location, a defect type and a defect magnitude (46). The CNN classifier is used to quickly determine whether there is a tunnel defect (45). If yes, the decision tree classifier is used to initially determine the location and type of the tunnel defect (46) and output the location and type of the tunnel defect to assess the health of the tunnel (47). The tunnel health management platform 30 releases information of the tunnel and its auxiliary structures, such as health status, defect location and defect assessment. It can be installed as a mobile application (APP) at a mobile terminal 7 or a personal computer (PC) terminal 8 of relevant personnel 32 in a subway operation and maintenance company for real-time understanding of the tunnel health status. When a heavy defect of the tunnel and its auxiliary structure is found, the relevant personnel 32 can take measures in time and use more sophisticated and professional testing instruments or methods to detect the tunnel. This avoids threats to the safety of people's property due to the inability to detect the tunnel defect in time, reduces the cost of defect detection, and improves the efficiency of operation and maintenance.

What is claimed is:

1. A tunnel defect detection and management system based on a vibration signal of a moving train, comprising:
sensors mounted on a train to acquire a vibration signal of a train in service as the train passes through a tunnel;
a signal transmission system on the train including a data acquisition module, a data processing module including a processor and a memory, and a wireless transmission module, the data acquisition module receiving the vibration signal in real-time, the data processing module encoding the vibration signal for transmission, the wireless transmission module wirelessly transmitting the vibration signal to a server over a network; and
the server including a processor and a non-transitory storage medium including a data analysis system and a tunnel health management platform accessible via a mobile device, the data analysis system including software analyzing and processing the vibration signal to identify a defect of a tunnel and to determine defect data including a type and a location of the defect for display via the tunnel health management platform,
wherein the software of the data analysis system further decodes and decompresses the vibration signal data to obtain original acceleration, speed and location data $X(t,a_x,a_y,a_z,v,s)$, wherein t represents a time, v represents a speed, s represents a location, $a_x$ represents an X-axis acceleration, $a_y$ represents a Y-axis acceleration, and $a_z$ represents a Z-axis acceleration.

2. The system of claim 1, wherein the software of the data analysis system further denoises and enhances a signal-to-noise ratio (SNR) of the vibration signal.

3. The system of claim 2, wherein the software of the data analysis system further performs dimensionality reduction to construct a feature vector $F(t,\alpha)$ as a sample set of machine learning (ML), wherein a represents a feature vector after dimensionality reduction.

4. The system of claim 3, wherein the software of the data analysis system includes a cyclic neural network classifier to determine the defect, and a decision tree classifier to determine the location and the type of the defect and a defect magnitude.

5. The system of claim 4, wherein the software of the data analysis system further supplements newly acquired data to a sample set to continue to train the cyclic neural network classifier and the decision tree classifier, so as to continuously improve accuracy of the cyclic neural network classifier and the decision tree classifier.

6. The system of claim 1, wherein the sensors include a plurality of acceleration sensors, speed sensors and positioning sensors.

7. The system of claim 6, wherein the acceleration sensors and the speed sensors are mounted on an axle, a bogie and in a carriage of the train.

8. The system of claim 6, wherein the sensors are fixed to the train by a magnetic support.

9. The system of claim 1, wherein the sensors are wireless sensors with a sampling frequency of 2 KHz.

10. The system of claim 1, wherein the network is a 5G network.

11. A tunnel defect detection method, comprising steps of:
acquiring, with sensors mounted on a train in service, a vibration signal of the train as the train passes through a tunnel;
transmitting with a wireless transmission module the vibration signal to a server through a network;
analyzing and processing the vibration signal by the server to identify a tunnel defect and determine a type and a location of the tunnel defect; and
outputting defect data including the type and the location of the tunnel defect to a tunnel health management platform accessible via a mobile device,
wherein analyzing and processing the vibration signal includes decoding and decompressing the vibration signal data to obtain original acceleration, speed and location data $X(t,a_x,a_y,a_z,v,s)$, wherein t represents a time, v represents a speed, s represents a location, $a_x$ represents an X-axis acceleration, $a_y$ represents a Y-axis acceleration, and $a_z$ represents a Z-axis acceleration.

12. The method of claim 11, wherein analyzing and processing the vibration signal includes denoising and enhancing a signal-to-noise ratio (SNR) of the vibration signal.

13. The method of claim 12, wherein analyzing and processing the vibration signal includes performing dimensionality reduction to construct a feature vector $F(t,\alpha)$ as a sample set of machine learning (ML), wherein a represents a feature vector after dimensionality reduction.

14. The method of claim 13, wherein analyzing and processing the vibration signal includes determining, by a cyclic neural network classifier, whether there is the tunnel defect and determining, by a decision tree classifier, the location and type of the tunnel defect.

15. The method of claim 14, further comprising training the cyclic neural network classifier through an initial sample such that the cyclic neural network classifier is able to determine a defect, and training the decision tree classifier such that the decision tree classifier is able to determine a defect location, a defect type and a defect magnitude.

16. The method of claim 15, further comprising supplementing newly acquired data to a sample set to continue to train the cyclic neural network classifier and the decision tree classifier, so as to continuously improve accuracy of the cyclic neural network classifier and the decision tree classifier.

17. The method of claim 11, wherein the sensors include a plurality of acceleration sensors, speed sensors and positioning sensors.

18. The method of claim 17, wherein the acceleration sensors and the speed sensors are mounted on an axle, a bogie and in a carriage of the train.

19. A tunnel defect detection and management system based on a vibration signal of a moving train, comprising:
sensors mounted on a train to acquire a vibration signal of a train in service as the train passes through a tunnel;
a signal transmission system on the train including a data acquisition module, a data processing module including a processor and a memory, and a wireless transmission module, the data acquisition module receiving the vibration signal in real-time, the data processing module encoding the vibration signal for transmission, the wireless transmission module wirelessly transmitting the vibration signal to a server over a network; and
the server including a processor and a non-transitory storage medium including a data analysis system and a tunnel health management platform accessible via a mobile device, the data analysis system including software analyzing and processing the vibration signal to identify a defect of a tunnel and to determine defect data including a type and a location of the defect for display via the tunnel health management platform,
wherein the sensors include a plurality of acceleration sensors, speed sensors and positioning sensors and the sensors are fixed to the train by a magnetic support.

* * * * *